United States Patent [19]
Leathers

[11] Patent Number: 6,013,041
[45] Date of Patent: Jan. 11, 2000

[54] APPARATUS AND METHOD FOR SIMULATING THERAPEUTIC MANIPULATION

[76] Inventor: Kevin P. Leathers, 13 Central Way, #206, Kirkland, Wash. 98033

[21] Appl. No.: 09/023,396

[22] Filed: Feb. 13, 1998

[51] Int. Cl.[7] .................................................. A61H 23/00
[52] U.S. Cl. ...................... 601/107; 601/134; 73/379.01; 73/862.542
[58] Field of Search .................................. 601/134, 135, 601/136, 137, 138, 84, 46, 107, 41–44; 73/379.01, 862.542, 379.02, 379.03, 379.08; 340/665; 600/587, 594; 434/262, 265; 482/44, 51

[56] References Cited

U.S. PATENT DOCUMENTS

| | | | |
|---|---|---|---|
| 4,159,640 | 7/1979 | Leveque et al. | 73/81 |
| 4,554,910 | 11/1985 | Lally | 601/41 |
| 5,158,096 | 10/1992 | Clark et al. | 73/380 |
| 5,239,988 | 8/1993 | Swanson et al. | 601/41 |
| 5,392,649 | 2/1995 | Yoo | 73/379.01 |
| 5,487,722 | 1/1996 | Weaver, II et al. | 601/41 |
| 5,496,257 | 3/1996 | Kelly | 601/41 |
| 5,582,580 | 12/1996 | Buckman, Jr. et al. | 601/41 |
| 5,589,639 | 12/1996 | D'Antonio et al. | 601/41 |
| 5,645,522 | 7/1997 | Lurie et al. | 601/43 |

*Primary Examiner*—Richard J. Apley
*Assistant Examiner*—Justine R. Yu
*Attorney, Agent, or Firm*—Marger Johnson & McCollom

[57] ABSTRACT

An apparatus and method are shown for simulating therapeutic manipulations with reduced risk of injury. The apparatus of the present invention includes a reciprocating body which fits into an axial bore of an elongate housing. A biasing member also fits within the axial bore and generates elastic resistance force in response when the reciprocating body and elongate housing are compressed together. A measuring device is included which measures the speed and amplitude of an impulse of the simulated manipulation and displays the results of the impulse on a display. The method of the present invention includes delivering an impulse of a therapeutic manipulation to the apparatus above rather than a training partner or an inanimate object, measuring the speed and amplitude of the impulse, and displaying the result of the measurement.

22 Claims, 7 Drawing Sheets

| SENSOR | SWITCH SETTING | | | |
|---|---|---|---|---|
| | LOW | MEDIUM | LARGE | LG. PATIENT |
| 332A | START POINT | START POINT | START POINT | |
| 332B | STOP POINT | | | START POINT |
| 332C | E2 POINT | | | |
| 332D | | STOP POINT | | |
| 332E | | E2 POINT | | |
| 332F | | | STOP POINT | STOP POINT |
| 332G | | | E2 POINT | E2 POINT |

APPARATUS AND METHOD FOR SIMULATING THERAPEUTIC MANIPULATION

BACKGROUND OF THE INVENTION

Therapeutic manipulation is utilized by therapists, such as chiropractors, osteopathic physicians, physiatrists and, in some cases, physical therapists, to realign the joints of a patient's spine. Manipulation involves the therapist applying pre-manipulative tension prior to administering an impulse to a patients joint along a predetermined vector.

Figure 1:
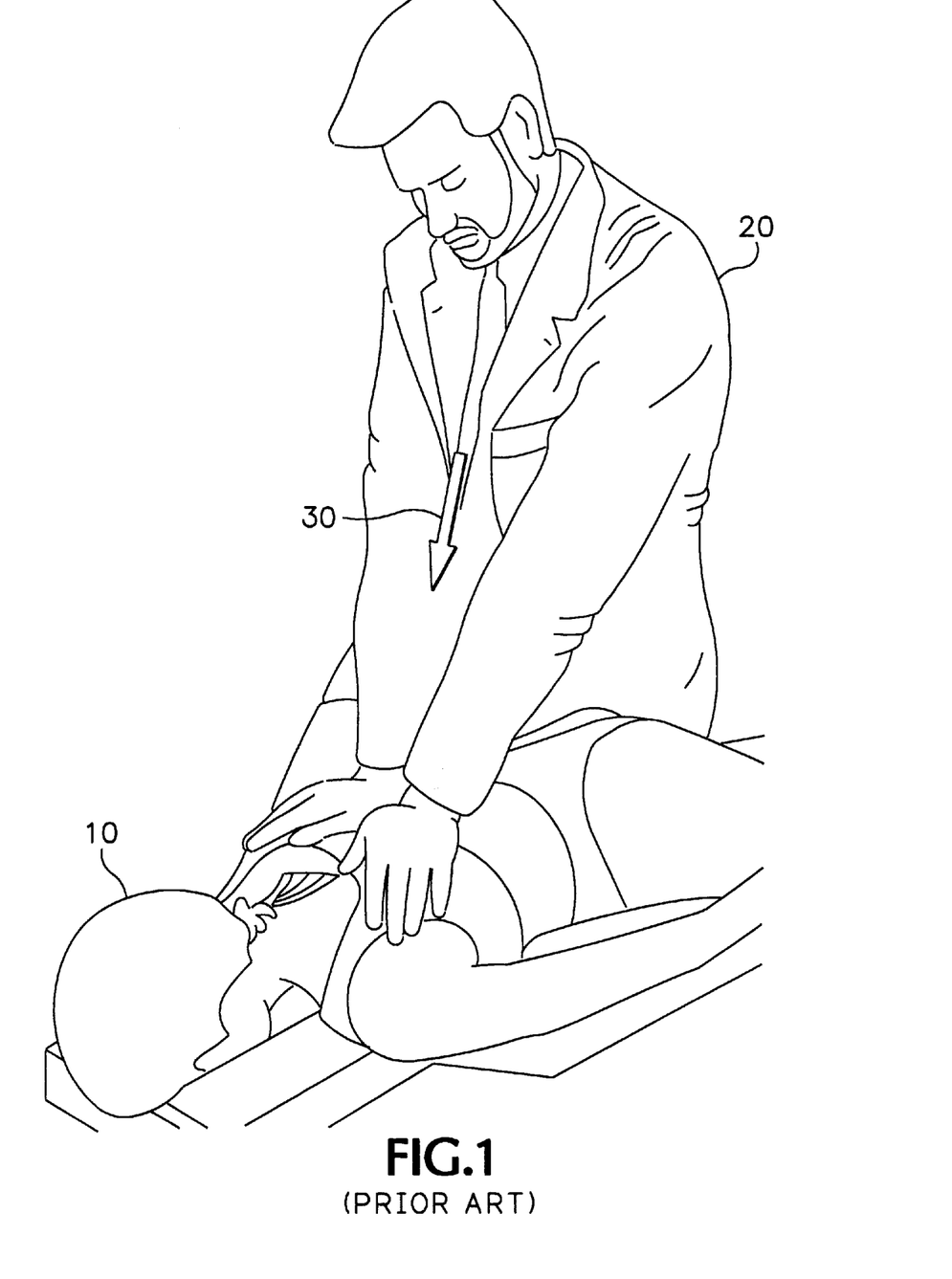
FIG. 1 illustrates a prior art therapeutic manipulation being performed on a patient.

FIG. 1 illustrates one example of a prior art therapeutic manipulation being administered by a therapist 20 to a patient 10. A vector of the force of the therapeutic manipulation is shown by arrow 30. Therapeutic manipulations are performed in any region of the spine and in a variety of doctor to patient positions.

The safety, comfort and effectiveness of a manipulative impulse is improved if the impulse is delivered with a high degree of speed along the plane of the joint under manipulation. However, an impulse that is delivered with too great an amplitude can injure the patient. Therapists practice manipulations in order to develop the psychomotor skills necessary to deliver high speed, controlled amplitude impulses along a given plane. One practice technique is to deliver impulses into inanimate objects. However, delivering impulses to an inanimate object risks injury to the shoulders or wrists of the therapist. Another training technique is to deliver impulses to a training partner, which risks injury to the training partner from high-amplitude impulses. In addition, for both these practice techniques, it is difficult to accurately measure the force and speed of the practice impulses.

Therefore, it is an object of the present invention to provide an apparatus and method for practicing therapeutic manipulations that is safe and which provides accurate feedback on the performance of the manipulations.

SUMMARY OF THE INVENTION

An embodiment of an apparatus for simulating therapeutic manipulation, according to the present invention, is composed of an elongate body having an axial bore and first and second end portions, the first end portion of the elongate body having an aperture in communication with the axial bore, an elongate reciprocating body having first and second end portions and a center portion, the first end portion of the elongate reciprocating body and the center portion of the elongate reciprocating body being adapted to fit into the axial bore of the elongate body through the aperture in the first end portion of the elongate body, and a biasing member adapted to fit within the axial bore of the elongate body, the biasing member being further adapted to be disposed along an axis of the axial bore between the first end portion of the elongate reciprocating body and the second end portion of the elongate body, the biasing member being still further adapted to bias the elongate reciprocating body to a first position relative to the axis of the axial bore. The apparatus also includes a measuring device adapted to measure an amount and rate of displacement of the elongate reciprocating body relative to the elongate body along the axis of the axial bore of the elongate body.

An embodiment of a method for simulating therapeutic manipulation, according to the present invention, includes providing a biased tension device, compressing the biased tension device with a manipulative maneuver, measuring an amplitude and rate of compression of the biased tension device, and displaying a result from measuring the amplitude and rate of compression of the biased tension device.

Another embodiment of an apparatus for simulating therapeutic manipulation, according to the present invention, includes an elastically compressible device for receiving a simulated therapeutic manipulation, a tracking device coupled to the elastically compressible device for tracking the amount of compressive displacement caused by the simulated therapeutic manipulation. The apparatus also includes a measurement system coupled to the tracking device and configured to generate a first signal tone responsive to a first selected displacement of the tracking device corresponding to pre-manipulative pressure of the simulated therapeutic manipulation, generate a first error signal responsive to a second selected displacement of the tracking device corresponding to an excessive amplitude of the simulated therapeutic manipulation, and measure a time interval from the first selected displacement to a third selected displacement of the tracking device corresponding to a duration of an impulse of the simulated therapeutic manipulation, wherein the second and third selected displacements are greater than the first selected displacement, and the second selected displacement is greater than the third selected displacement.

The foregoing and other objects, features and advantages of the invention will become more readily apparent from the following detailed description of a preferred embodiment of the invention which proceeds with reference to the accompanying drawings.

DETAILED DESCRIPTION

The present invention is directed toward a spinal manipulation simulating device which allows students to develop the psychomotor skills necessary to deliver high speed, controlled amplitude impulses along a given plane. The present invention aids in the strength and speed training of the specific muscle groups of the student which are used in delivering therapeutic manipulations by presenting resistance during a simulated manipulation.

Figure 2:
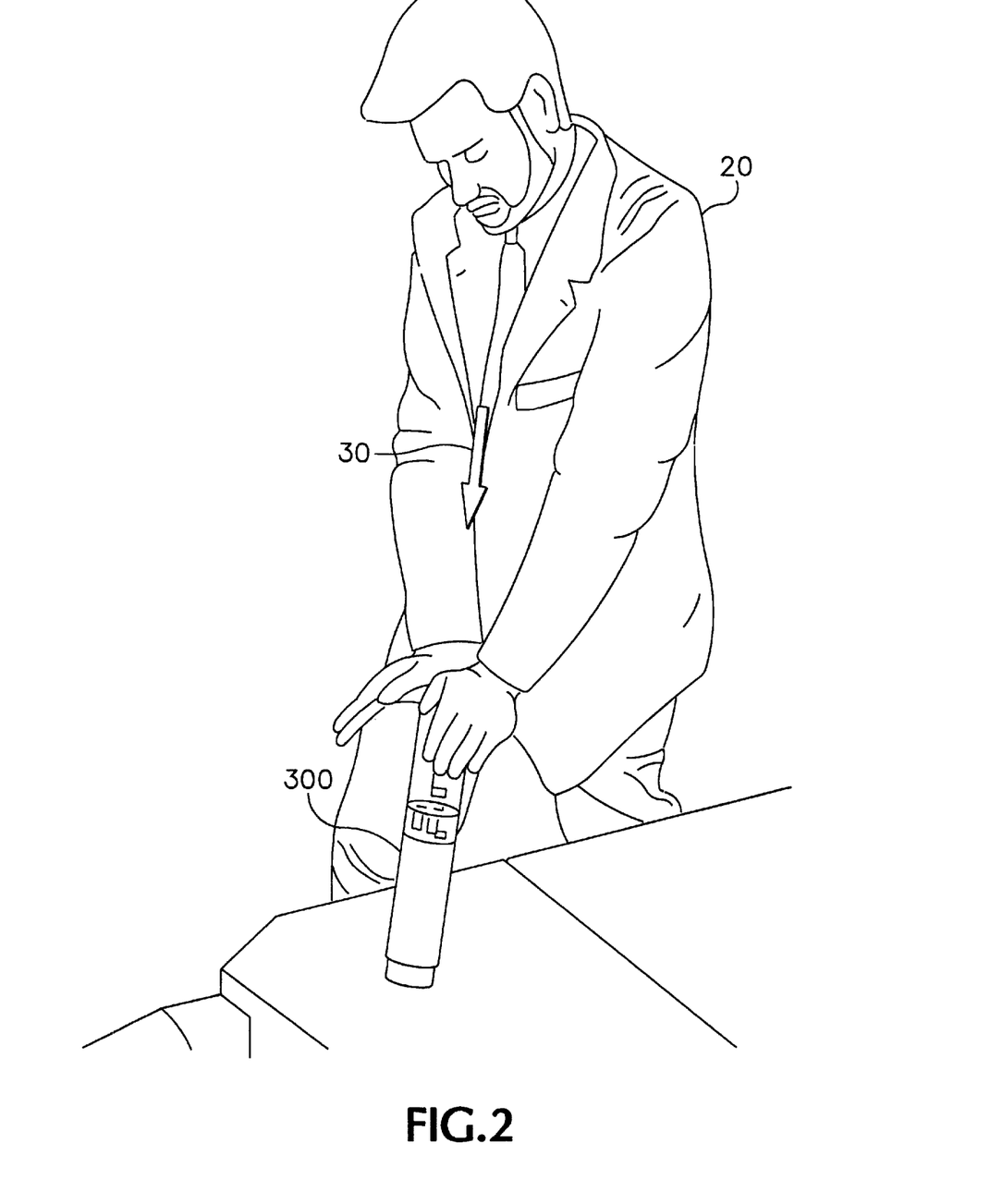
FIG. 2 illustrates an embodiment of the present invention being used to simulate the therapeutic manipulation of FIG. 1.

FIG. 2 illustrates a therapist 20 performing the therapeutic manipulation of FIG. 1 with an embodiment of the apparatus 300 of the present invention. An impulse is delivered to the apparatus 300 with the force vector represented by arrow 30.

The apparatus 300 can also be utilized to simulate other doctor to patient positions corresponding to a variety of spinal manipulations.

Figure 3:
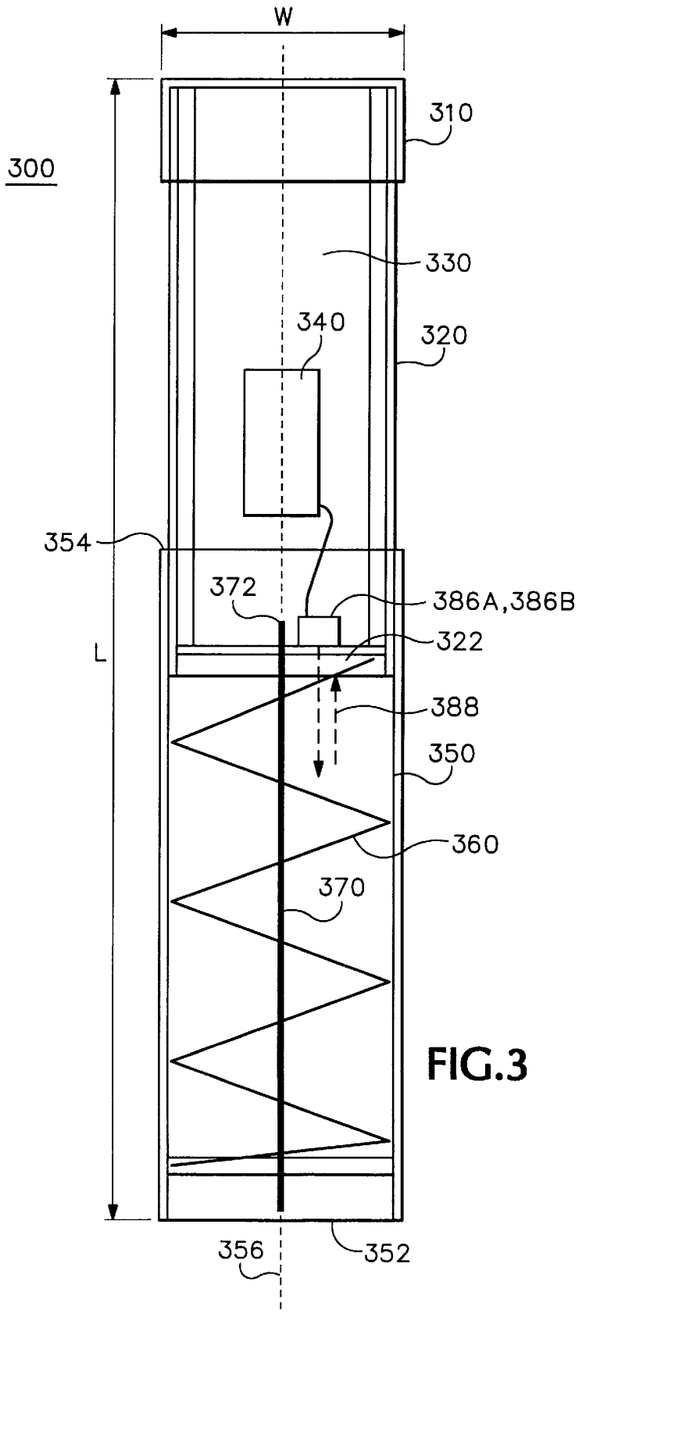
FIG. 3 is a side cut-away perspective of an embodiment of the present invention.

A sideview of apparatus 300 is illustrated in FIG. 3. The apparatus 300 includes an elongate housing 350 having a closed end 352 and an open axial bore 354 opposite closed end 352. An elongate reciprocating body 320 has one end enclosed by cap 310 and another end 322 which includes an aperture (not shown) to accommodate displacement member 370. The elongate reciprocating body 320 is sized to fit inside elongate housing 350 and slide freely along a lengthwise axis 356 of elongate housing 350. Elongate reciprocating body 320 and elongate housing 350 are cylindrical in shape but can be constructed to be non-cylindrical so long as the bore formed by elongate housing 350 permits insertion and reciprocating motion of elongate reciprocating body 320.

The width W of the apparatus 300 is selected to approximate the size of a motion segment of the thoracic or lumbar spine. A motion segment is typically two adjacent vertebrae. The length L of apparatus 300 is selected to approximate the depth of an average person lying supine with his arms across his chest, which is a typical position for supine thoracic manipulation. The length L also approximates the width of a patients hips in order to allow simulation of lumbar manipulations with the patient in a side posture position. The cylindrical shape and reciprocating nature of the reciprocating body 320 and elongate housing 350 serve to encourage focus of the therapist's line of drive along a single plane which can be selected by the therapist to correspond to a plane of a spinal joint under simulation. The apparatus 300 can also be incorporated into a human dummy in order to simulate manipulations using a more lifelike simulation tool.

A biasing member 360 also fits within elongate housing 150 between closed end 352 of elongate housing 350 and end 322 of elongate reciprocating body 320. Biasing member 360, which is a coiled spring in FIG. 3, biases elongate reciprocating body 320 to a position within the axial bore of elongate housing 350 where the combined length of elongate reciprocating body 320 and elongate housing 350 is approximately fourteen inches. Biasing member 360 generates an elastic resistance force along axis 356 which resists the further insertion of reciprocating body 320 into elongate housing 350. Other devices, such as a sealed gas envelope, can also be employed as biasing member 360. The biasing member 360 can be replaced to increase the resistance as the therapist's strength develops with practice.

A displacement member 370, which is shown as a reciprocating rod in FIG. 3, is attached to closed end 352 and disposed along axis 356 of elongate housing 350 through an aperture in end 322 of reciprocating body 320. As reciprocating body 320 is pushed into the axial bore of elongate housing 350, tip 372 of displacement member 370 extends farther into reciprocating body 320 along axis 356.

Figures 4, 5:
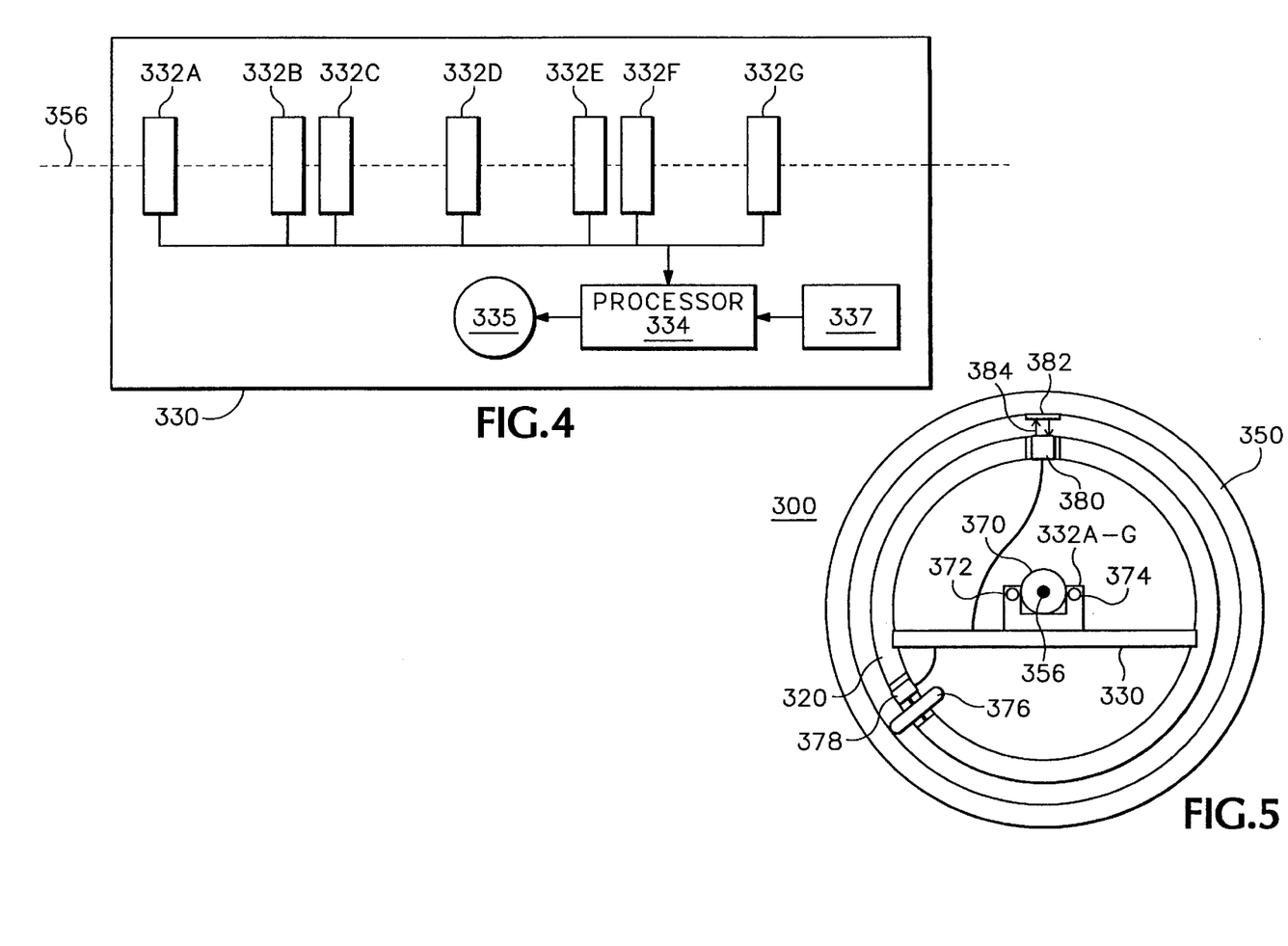
FIG. 4 illustrates a circuit board of the embodiment of FIG. 3.
FIG. 5 is an end view of the embodiment of FIG. 3.

A circuit board 330 having a display 340 is mounted within elongate reciprocating body 320. Circuit board 330 also includes sensors 332A–G, shown in FIG. 4, disposed along axis 356 and which are connected to processor 334 to form a measuring device for measuring the displacement of reciprocating body 320 relative to elongate housing 350. FIG. 5 is an end view of the embodiment of the present invention shown in FIG. 4 which illustrates circuit board 330 disposed within reciprocating body 320 which is, in turn, disposed within the axial bore of elongate housing 350. Displacement member 370 reciprocates along axis 356 where the displacement member is in communication with sensors 332A–G.

When elongate reciprocating body 320 is pushed into elongate housing 350, sensors 332A–G, which are light gates in the embodiment of FIGS. 4 and 5, sense the passage of tip 372 (FIG. 3) of displacement member 370. Processor 334 integrates the sensory input from sensors 332A–G in order to determine the amount and rate of relative displacement of reciprocating body 320 relative to elongate housing 350.

Processor 334 is programmed to measure and display the speed of a simulated impulse and indicate whether the amplitude of an impulse is too great. In addition, an amplitude threshold can be adjusted through the selection of setting for switches 337, which are input to processor 334.

Circuit board 330 includes user accessible switches 337 which are used to turn the device on and off, select the type of simulated impulse, and adjust the sensitivity of the device 30. For instance, one type of simulated impulse is from a neutral position wherein no pre-manipulative pressure is applied and the thrust is intended to be initiated into the device 30 without initially applying pressure to the device. Another type of impulse requires pre-impulse pressure wherein enough pressure must be applied to the device 30 to activate the timer in processor 334 and trigger a queuing signal to indicate that enough pressure has been applied. Finally, a recoil style impulse can be selected wherein the impulse may be initiated either from a neutral position or from a position of pre-impulse tension with the thrust being timed from the initial sensor to the ending sensor and back to the initial sensor again, thereby adding the time it takes the therapist to recoil from the impulse end point into the total time of the thrust.

Figure 6:
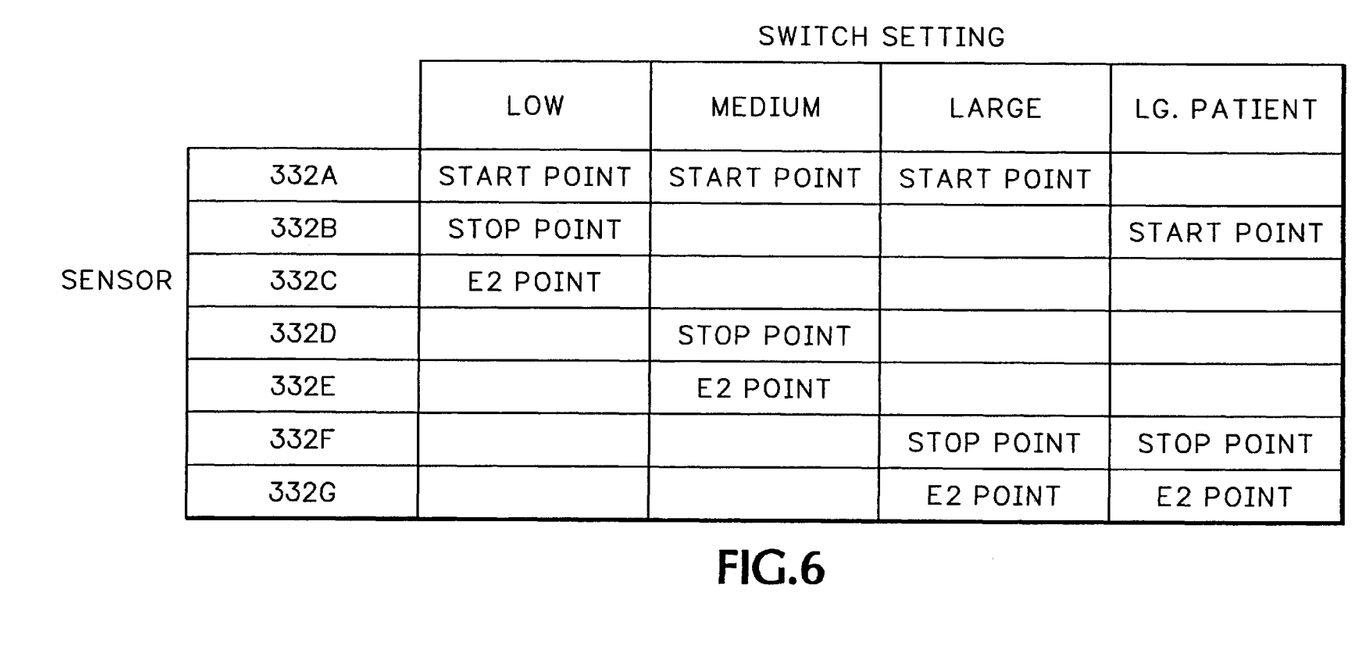
FIG. 6 is a table correlating settings for the switches of circuit board of FIG. 4 to the functions of the sensors of FIG. 4 for one embodiment of the present invention.

Switches 337 are also used to adjust the sensitivity of the device 30. For instance, greater sensitivity is desireable for smaller patients whereas greater force is appropriate for larger patients. Similarly, different joints require different levels of force for manipulation. Therefore, a variety of settings LOW, MEDIUM, HIGH and LG. PATIENT are available for simulation. The table of FIG. 6 illustrates the correspondence between the function of sensors 332A–G for the various settings of switches 337. As the setting of switches 337 is varied, the START POINT, STOP POINT and E2 POINT changes, as indicated in the table of FIG. 6.

Figure 7:
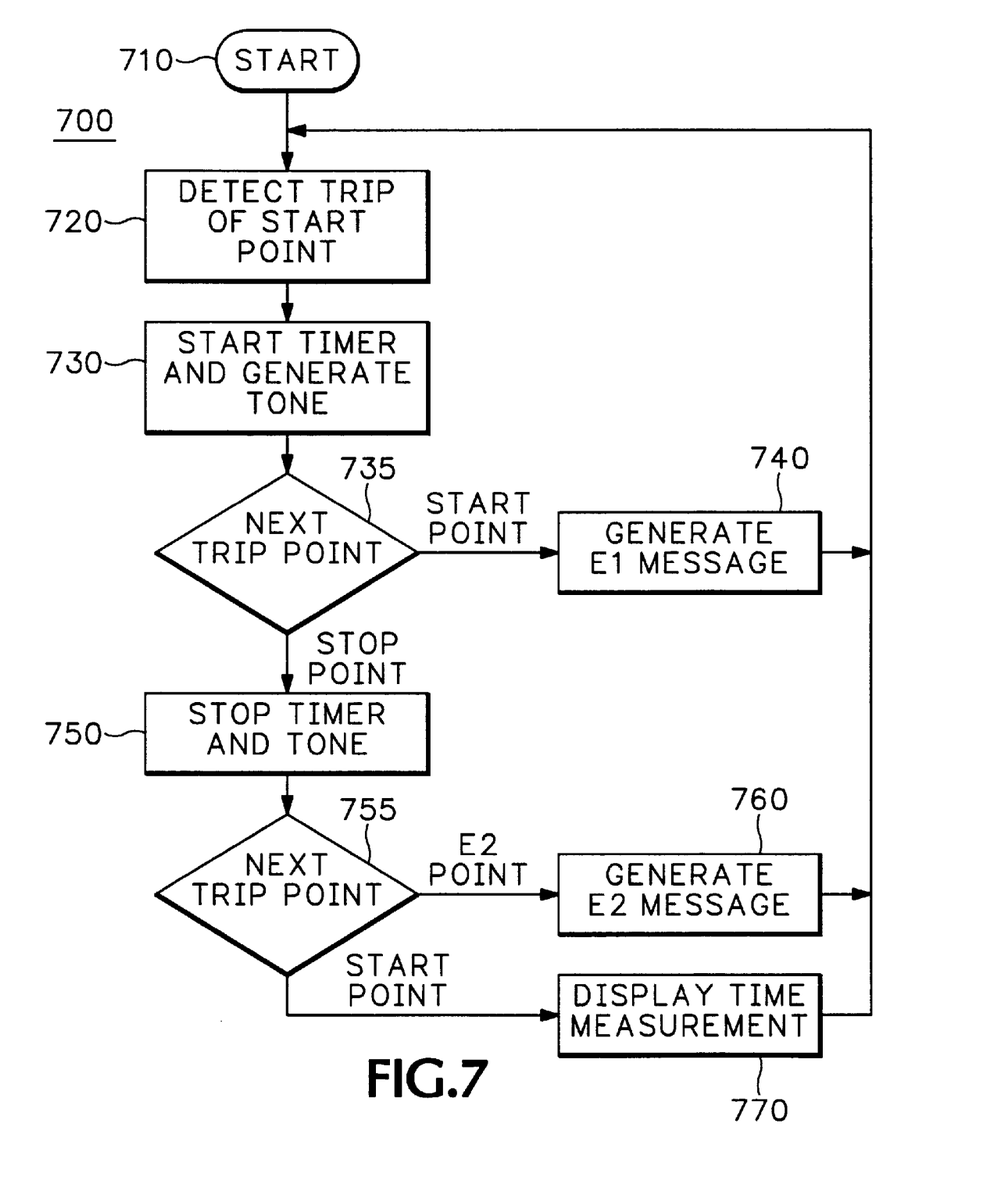
FIG. 7 is a flow chart of the function of an embodiment of the processor of the circuit board of FIG. 4 under a standard setting.

The flow of operation for an embodiment of the present invention with respect to the START POINT, STOP POINT and E2 POINT is illustrated in FIG. 7 where a standard impulse type is selected using switches 337. Processor 334 checks the settings of switches 337 to determine which of sensors 332A–G to utilize as the START POINT, STOP POINT and E2 POINT. The processor then waits for the START POINT sensor 332A–G to be actuated, as indicated at step 720. Upon actuation of the START POINT sensor, processor 334 generates the queuing tone to indicate that pre-impulse pressure has been applied and starts an internal timer. Processor 334 then monitors sensors 332A–G at step 735 to determine which one of the START POINT and the STOP POINT next changes state. If the START POINT sensor is de-actuated next, then pre-impulse pressure has been released and processor 334 outputs the E1 error message to display 340, as indicated in step 740. Conversely, if the STOP POINT sensor is actuated next, then processor 334 halts the queuing tone and the internal timer, as indicated at step 750.

Processor 334 now monitors, at step 755, which one of the E2 POINT and START POINT sensors next changes state. If the E2 POINT sensor is next actuated, then the amplitude of the simulated impulse is too high and processor 334 outputs an E2 message to display 340, as indicated in step 760. On the other hand, if the START POINT sensor is next de-actuated, then a valid impulse has been simulated and processor 334 outputs the time measurement of the internal timer to display 340, as indicated in step 770.

The standard impulse type switch setting can also be employed to simulate impulses delivered from an initial neutral position where no pre-manipulative pressure is applied.

Figure 8:
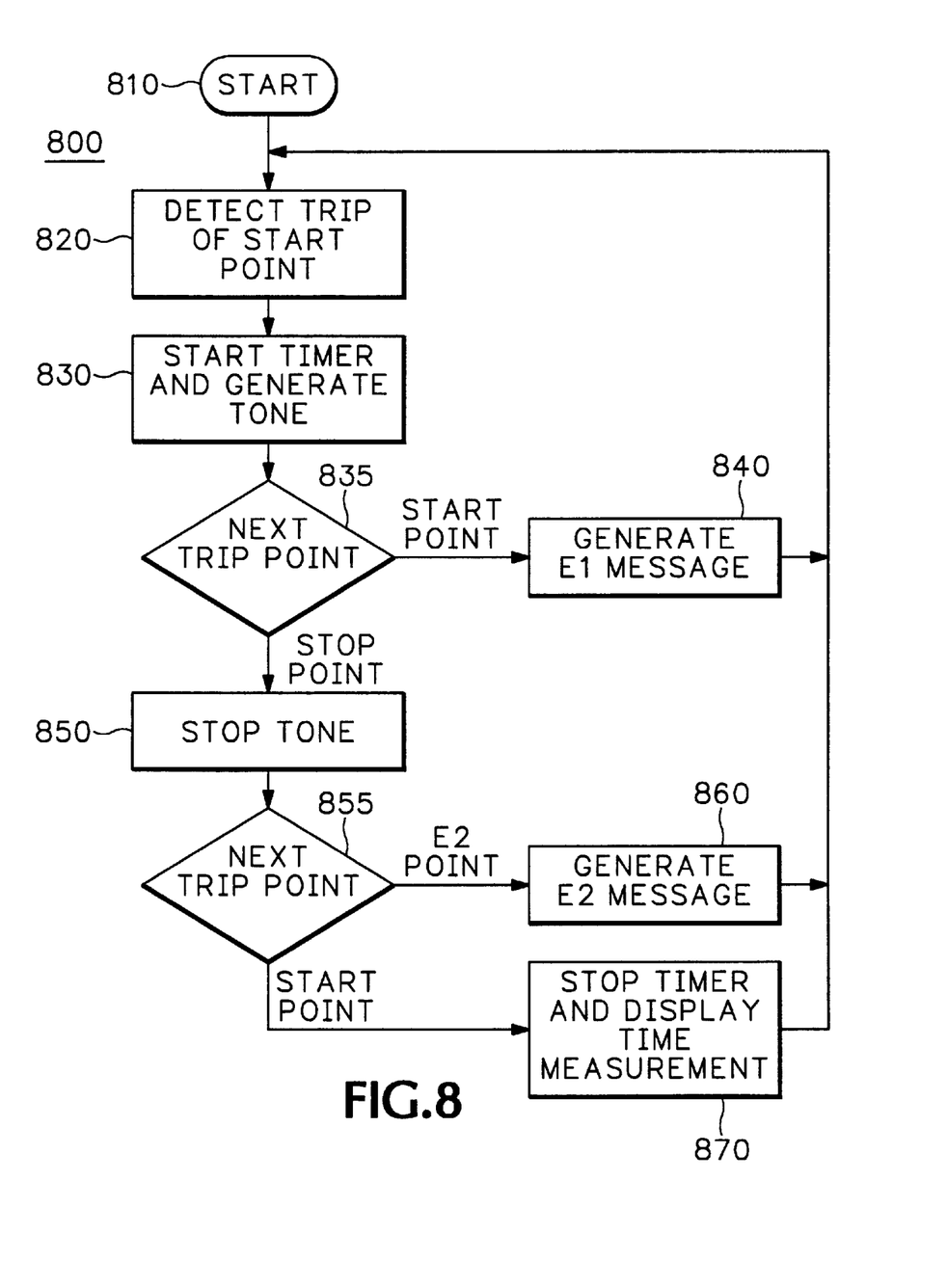
FIG. 8 is a flow chart of the function of an embodiment of the processor of the circuit board of FIG. 4 under a recoil setting.

FIG. 8 illustrates the flow of operation for an embodiment of the present invention where a recoil type impulse is selected using switches 337. The operation in recoil mode is largely the same as the function illustrated in FIG. 7. Processor 334 checks the settings of switches 337 to determine which of sensors 332A–G to utilize as the START POINT, STOP POINT and E2 POINT. The processor then waits for the START POINT sensor 332A–G to be actuated, as indicated at step 820. Upon actuation of the START POINT sensor, processor 334 generates the queuing tone to indicate that pre-impulse pressure has been applied and starts the internal timer. Processor 334 then monitors sensors 332A–G at step 835 to determine which one of the START POINT and the STOP POINT next changes state. If the START POINT sensor is de-actuated next, then pre-impulse pressure has been released and processor 334 outputs the E1 error message to display 340, as indicated in step 840. Conversely, if the STOP POINT sensor is actuated next, then processor 334 halts the queuing tone, as indicated at step 850, but not the internal timer.

Processor 334 now monitors, at step 855, which one of the E2 POINT and START POINT sensors next changes state. If the E2 POINT sensor is next actuated, then the amplitude of the simulated impulse is too high and processor 334 outputs an E2 message to display 340, as indicated in step 860. On the other hand, if the START POINT sensor is next de-actuated, then a valid impulse has been simulated and processor 334 halts the internal timer and outputs the time measurement of the internal timer to display 340, as indicated in step 870.

The LOW switch setting of FIG. 6 is selected to simulate low amplitude manipulations requiring a high degree of accuracy and which need only a standard level of pre-manipulative pressure, such as cervical spine manipulations. Thus, the LOW switch setting activates sensor 332A as the START POINT, resulting in a queuing tone at a relatively low level of premanipulative pressure. Sensor 332B is the STOP POINT which can be reached by a low amplitude impulse. Note that sensor 332B, the STOP POINT, is positioned relatively close to sensor 332C, which is the E2 POINT. As a result, the manipulations performed at the LOW setting require a high degree of accuracy in order to reach the STOP POINT without also tripping the E2 POINT.

The MEDIUM switch setting approximates the impulses required for manipulations in the thoracic region of the spine which require higher amplitude levels and have a larger margin for error. The START POINT remains at sensor 332A since no greater level of pre-manipulative tension is needed. The STOP POINT, however, moves to sensor 332D which is positioned farther from sensor 332A than sensor 332B in order to correspond to a higher amplitude level. Also, the E2 POINT is moved to sensor 332E and the space between sensors 332D and 332E is greater than the space between sensors 332B and 332C in order to allow for a higher margin of error in amplitude level for the simulated impulse.

Similarly, the LARGE switch setting approximates the impulses required for manipulations in the lumbar region of the spine which require still higher amplitude levels and also have a large margin for error. The START POINT remains at sensor 332A since no greater level of pre-manipulative tension is needed. The STOP POINT, however, moves to sensor 332F which is positioned farther from sensor 332A than sensor 332B or sensor 332D in order to correspond to a higher amplitude level. Also, the E2 POINT is moved to sensor 332G and the space between sensors 332F and 332G is greater than the space between sensors 332B and 332C in order to allow for a high margin of error in amplitude level for the simulated impulse.

The LG. PATIENT switch setting approximates the impulses required for high amplitude manipulations similar to the LARGE switch setting, but with a deeper level of pre-manipulative tension, as is typically required in manipulations performed on very large patients. The START POINT moves to sensor 332B to simulate a greater level of pre-manipulative tension. The STOP POINT remains at sensor 332F and the E2 POINT remains at sensor 332G.

The switch settings and sensor assignments of the table of FIG. 6, along with the positions of sensors 332A–G of FIG. 4, demonstrate one embodiment of the present invention. Variations on the switch settings and sensor positioning can be made without departing from the spirit of the present invention.

A detailed example of the operation of the circuit board 330 will now be described. If the processor 334 is programmed to monitor pre-impulse pressure and the switches 337 are set to the LG. PATIENT value, then, when tip 372 of displacement member 370 actuates sensor 332B, processor 334 will clear the display, start an internal timer, and generate a ready signal, via tone generator 335, indicating that pre-impulse pressure has been applied. Processor 334 then monitors sensors 332B and 332F to determine which changes state next. If sensor 332B is de-actuated next, then the therapist has released the pre-impulse pressure before delivering the impulse and processor 334 displays the E1 error message on display 340 indicating that pre-impulse pressure has been released and outputs an error tone via tone generator 335. If sensor 332F is actuated, then processor 334 halts the ready tone and the internal clock. If sensor 332B is then de-actuated, processor 334 outputs the amount of time measured by the internal clock to display 340. If, however, sensor 332G is actuated after sensor 332F is actuated, then the amplitude of the impulse was too great and processor 334 displays the E2 error message indicating an excessive amplitude error and outputs an error tone via tone generator 335.

Other approaches to measuring the relative displacement between reciprocating body 320 and elongate housing 350 can be employed in place of the displacement member 370 and sensors 332A–G discussed above. For instance, a measuring wheel mechanism, similar to the mechanism of a computer mouse, can be mounted in reciprocating body 320 such that the measuring wheel is in contact with an inner surface of the axial bore of elongate housing 350 and rotates in response to relative motion between reciprocating body 320 and elongate housing 350. In addition, other methods for measuring displacement, such as a sound transceiver which determines relative displacement based upon reflection of a transmitted sound wave, and which are known to those skilled in the art, can be utilized in the present invention. Still other approaches to the embodiment of the machine may incorporate the utilization of custom made transducers and/or potentiometers to perform the displacement and force measuring function. Referring to FIG. 4, the plurality of sensors 332A–332G can comprise a plurality of light activated switches wherein each one of the light activated switches includes a light source 374 and a light receiver 372 adapted to be disposed transverse to the axis 356 of the axial bore 354 of the elongate housing 350 such that each light activated switch 332A–332G is actuated by the motion of the second end portion of the rod 370 between the light source 374 and the light receiver 372 of each light activated switch 332A–332G.

As mentioned above, in another embodiment of the invention a tracking wheel 376 is adapted to rotate responsive to changes in the relative displacement between the elongate reciprocating body 320 and the elongate housing 350. A tracking wheel sensor 378 is adapted to sense the position of the tracking wheel 376. The processor 334 is coupled to the tracking wheel sensor 378 and adapted to calculate the amount and rate of displacement of the elongate reciprocating body 320 relative to the elongate housing 350 based upon the position of the tracking wheel 376. The tracking wheel 376 is adapted to be disposed on the elongate reciprocating body 320 and communicate with an inner surface of the axial bore 354 of the elongate housing 350.

The sensing devices 332A–332G can also comprise a light transmitter 380 adapted to produce a light beam 384. A reflective strip 382 reflects the light beam 384 responsive to changes in the relative displacement between the elongate reciprocating body 320 and the elongate housing 350. A receiver included with the light transmitter 380 receives the light beam 384 reflected from the reflective strip 382. The processor 334 is coupled to the light receiver 380 and adapted to calculate the amount and rate of displacement of the elongate reciprocating body 320 relative to the elongate housing 350 based upon the reflected light beam 384. The reflective strip 382 is disposed along an inner surface of the elongate housing 350. The light transmitter and light receiver 380 and the processor 334 are disposed within the elongate reciprocating body 320.

Referring to FIG. 3, the sensing device can also comprise a wave beam emitter 386A adapted to transmit a focused wave beam 388. A wave beam receiver 386B is adapted to receive the focused wave beam 388. The processor 334 is coupled to the wave beam receiver 386B and adapted to calculate the rate of displacement of the elongate reciprocating body 320 relative to the elongate housing 350 based upon the focused wave beam 388 received by the wave beam receiver 386B. The focused wave beam 388 received by the wave beam receiver 386B is modulated responsive to changes in the relative displacement between the elongate reciprocating body 320 and the elongate housing 350.

The wave beam emitter 386A is adapted to transmit the focused wave beam 388 parallel to the axis 356 of the axial bore 354 of the elongate cavity of housing 350. The processor 334 is adapted to calculate the rate of displacement of the elongate reciprocating body 320 relative to the elongate housing 350 based upon a doppler shift of the focused wave beam 388 received by the wave beam receiver 386B. The wave beam emitter 386A can be an infrared transmitter and the wave beam emitter 386B can comprise an infrared receiver.

The method of the present invention can be practiced by delivering impulses to apparatus 300 as illustrated in FIG. 2. Apparatus 300 is substituted for a patient or training partner and an impulse, having the force vector indicated by arrow 30, is delivered to apparatus 300 which monitors the impulse, as described above, and displays the results of the impulse on display 340. The therapist 20 is therefore able to practice a therapeutic manipulation and measurably observe his impulse times, but at reduced risk of injury to either the therapist or a patient or training partner.

In the example shown in FIGS. 1 and 2, the patient 10 is in a prone position with the therapist 20 positioned above the patient with the vector 30 of the impulse being posterior to anterior and slightly inferior to superior. The contact point on the patient 10 is in the mid-thoracic spine. This positioning is used to mobilize a thoracic spinal segment into flexion.

To simulate a manipulation with the device 300, the settings of switches 337 are selected for the desired amplitude and thrust type for the manipulation to be simulated. In FIG. 2, the device 300 is then positioned by therapist 20 to simulate an impulse along the same vector 30 as the impulse of FIG. 1. The therapist then gently applies pressure to the end of the device 300 causing the elongate reciprocating body 320 to slide into elongate housing 350, see FIG. 3. The motion of elongate reciprocating body 320 with respect to elongate housing 350 is measured by the passage of the tip 372 of displacement member 370 through sensors 332A–G. As the tip 372 of displacement member 370 actuates the START POINT sensor, the setting of switches 337 determining which of sensors 332A–G that is the START POINT sensor, the queuing tone is output by tone generator 335. See FIGS. 6 and 7.

At this point, if therapist 20 releases the pressure on device 300, the tip 372 of displacement member 370 will de-actuate the START POINT sensor before the STOP POINT sensor is actuated causing the E1 message to be displayed on display 340 indicating the loss of simulated pre-manipulative tension. If, however, the simulated impulse is correctly delivered into device 300 without losing the pre-manipulative tension, then the STOP POINT sensor will be actuated to start the internal clock in processor 334. Should the therapist 20 force the tip 372 of displacement member 370 through to actuate the E2 POINT sensor, then the amplitude of the simulated impulse is too great and the E2 message is displayed. If the E2 POINT sensor is not actuated, then the internal timer continues to run until the START POINT sensor is de-actuated to halt the clock and cause the elapsed time to be displayed via display 340. This process can be repeated to simulate the manipulations for any region of the spine.

Thus, using the device 300 of the present invention, the therapist 20 is able to learn to focus the thrust vector 30 of the impulse along a single plane corresponding to the plane of the joint. The device 300 also enables the therapist 20 to learn to produce high velocity impulses within a preselected amplitude and develop the strength and muscle coordination in specific muscle groups of the arms, hands and upper body of the therapist 20 to be able to produce such high velocity impulses.

Having described and illustrated the principles of the invention in an embodiment thereof, it should be apparent that the invention can be modified in arrangement and detail without departing from such principles. I claim all modifications and variations coming within the spirit and scope of the following claims.

I claim:

1. An apparatus for simulating therapeutic manipulation comprising:
   an elongate body having an axial bore and first and second end portions, the first end portion of the elongate body having an aperture in communication with the axial bore;
   an elongate reciprocating body having first and second end portions and a center portion, the first end portion of the elongate reciprocating body and the center portion of the elongate reciprocating body being adapted to fit into the axial bore of the elongate body through the aperture in the first end portion of the elongate body;

a biasing member adapted to fit within the axial bore of the elongate body, the biasing member being further adapted to be disposed along an axis of the axial bore between the first end portion of the elongate reciprocating body and the second end portion of the elongate body, the biasing member being still further adapted to bias the elongate reciprocating body to a first position relative to the axis of the axial bore;

a sensing device disposed along the elongate body for detecting the displacement between the elongate body and the elongate reciprocating body;

a switching circuit that selects the sensing device for a correct therapeutic manipulative pressure start point and a correct therapeutic manipulative pressure stop point; and a processor identifying correct joint therapies applied to different selectable simulated joint conditions simulated by the elongate body and elongate reciprocating body by using the sensing device to detect how far the elongate reciprocating body moves during application of the therapeutic manipulation force and then comparing the detected movement to the start and stop points selected for the sensing device.

2. The apparatus of claim 1 including a rod attached to the elongate body and disposed parallel to the axis of the axial bore between the first end portion of the elongate reciprocating body and the second end portion of the elongate body; and the sensing device including a plurality of sensors adapted to be disposed along the axis of the axial bore of the elongate body, whereby the sensors detect the displacement between the elongate body and the elongate reciprocating body by detecting movement of the rod the sensing device detecting the relative displacement of the elongate body and the elongate reciprocating body by sensing the position of the displacement member relative to the sensing device.

3. The apparatus of claim 1 wherein the sensing device comprises:

a tracking wheel adapted to rotate responsive to changes in the relative displacement between the elongate reciprocating body and the elongate body;

a tracking wheel sensor adapted to sense the position of the tracking wheel; and the processor coupled to the tracking wheel sensor and adapted to calculate the amount and rate of displacement of the elongate reciprocating body relative to the elongate body based upon the position of the tracking wheel.

4. The apparatus of claim 3, wherein the tracking wheel is further adapted to be disposed on the elongate reciprocating body and communicate with an inner surface of the bore of the elongate body.

5. The apparatus of claim 1 wherein the sensing device includes:

a light transmitter adapted to produce a light beam;

a reflective strip reflecting the light beam responsive to changes in the relative displacement between the elongate reciprocating body and the elongate body;

a light receiver adapted to receive the light beam reflected from the reflective strip; and the processor coupled to the light receiver and adapted to calculate the amount and rate of displacement of the elongate reciprocating body relative to the elongate body based upon the reflected light beam.

6. The apparatus of claim 5, wherein:

the reflective strip is disposed along an inner surface of the elongate body; and the light transmitter, light receiver and signal processing circuit are disposed within the elongate reciprocating body.

7. The apparatus of claim 1, wherein the sensing device includes:

a wave beam emitter adapted to transmit a focused wave beam;

a wave beam receiver adapted to receive the focused wave beam; and the processor coupled to the wave beam receiver and adapted to calculate the rate of displacement of the elongate reciprocating body relative to the elongate body based upon the focused wave beam received by the wave beam receiver, wherein the focused wave beam received by the wave beam receiver is modulated responsive to changes in the relative displacement between the elongate reciprocating body and the elongate body.

8. The apparatus of claim 7, wherein:

the wave beam emitter is adapted to transmit the focused wave beam parallel to the axis of the axial bore of the elongate body and within the axial bore of the elongate cavity; and the processor is further adapted to calculate the rate of displacement of the elongate reciprocating body relative to the elongate body based upon a doppler shift of the focused wave beam received by the wave beam receiver.

9. The apparatus of claim 4, wherein:

the wave beam emitter is comprised of an infrared transmitter; and the wave beam emitter is comprised of an infrared receiver.

10. An apparatus for simulating therapeutic manipulation comprising:

an elongate body having an axial bore and first and second end portions, the first end portion of the elongate body having an aperture in communication with the axial bore;

an elongate reciprocating body having first and second end portions and a center portion, the first end portion of the elongate reciprocating body and the center portion of the elongate reciprocating body being adapted to fit into the axial bore of the elongate body through the aperture in the first end portion of the elongate body;

a biasing member adapted to fit within the axial bore of the elongate body, the biasing member being further adapted to be disposed along an axis of the axial bore between the first end portion of the elongate reciprocating body and the second end portion of the elongate body, the biasing member being still further adapted to bias the elongate reciprocating body to a first position relative to the axis of the axial bore; and a displacement member adapted to be attached to the elongate body and disposed parallel to the axis of the axial bore between the first end portion of the elongate reciprocating body and the second end portion of the elongate body, the displacement member including a rod having first and second end portions, the first end portion of the rod being adapted to be attached to the second end portion of the elongate body and the rod being disposed along the axis of the axial bore;

a sensing device adapted to be disposed within the elongate reciprocating body, the sensing device being further adapted to communicate with the displacement member, wherein the sensing device measures the relative displacement of the elongate body and the elongate reciprocating body by sensing the position of the displacement member relative to the sensing device, the sensing device further including a plurality of sensors adapted to be disposed along the axis of the axial bore of the elongate body and in communication with the rod, whereby the sensing device detects the displacement between the elongate body and the elongate reciprocating body by the communication between the second end portion of the rod and the plurality of sensors;

the elongate reciprocating body further adapted to form an axial bore which is adapted to receive the sensing device and the first end portion of the elongate reciprocating body and further having an aperture which communicates with the axial bore of the elongate reciprocating body, wherein the aperture in the first end portion of the elongate reciprocating body is adapted to receive the rod; and a measuring device adapted to measure an amount and rate of displacement of the elongate reciprocating body relative to the elongate body along the axis of the axial bore of the elongate body, the rate of displacement measured between the elongate body and the elongate reciprocating body by measuring a time duration that the second end portion of the rod is in communication with a predetermined one of the plurality of sensors.

11. The apparatus of claim 10, wherein the plurality of sensors comprises a plurality of light activated switches wherein each one of the light activated switches includes a light source and a light receiver adapted to be disposed transverse to the axis of the axial bore of the elongate body such that each light activated switch is actuated by the motion of the second end portion of the rod between the light source and the light receiver of each light activated switch.

12. The apparatus of claim 11, wherein:

the sensing device further includes a display, the display adapted to output the rate of displacement measured by the sensing device; and the elongate reciprocating body is composed of a transparent material.

13. The apparatus of claim 12, wherein the elongate body, the elongate reciprocating body and the axial bore of the elongate body are each cylindrical in shape.

14. The apparatus of claim 1 wherein the apparatus is used as a spinal vertebrae simulator and the processor identifies correct and incorrect therapeutic manipulation forces received by the spinal vertebrae simulator.

15. The apparatus of claim 13, wherein a length of the apparatus is approximately 14 inches.

16. A therapeutic joint manipulation simulator comprising:

a housing having a hole extending from a first end to a second end of the housing;

a reciprocating member adapted to telescopingly insert into and out of the hole in the housing;

a biasing member adapted to fit within the hole in the housing between the first end of the housing and the reciprocating member;

a sensing device detecting the displacement of the reciprocating member inside the housing;

a switching circuit preselecting in the sensing device a displacement of the reciprocating member representing a correct therapeutic manipulative pressure start point and selecting another displacement of the reciprocating member representing a correct therapeutic manipulative pressure stop point; and a processor identifying correct and incorrect joint therapies applied to different selectable simulated joint conditions simulated by the housing and the reciprocating member by identifying with the sensing device a first distance the reciprocating member is initially inserted into the housing during application of a pre-manipulation pressure and then identifying with the sensing device a second distance the reciprocating member is inserted into the housing during application of an applied primary manipulation pressure and then comparing the identified first and second distance with the preselected correct therapeutic manipulative pressure start and stop points.

17. A therapeutic joint manipulation simulator according to claim 16 wherein the processor displays a result from applying the primary therapeutic manipulation pressure by displaying an error message when the reciprocating device moves past the preselected correct therapeutic manipulative pressure stop point or moves below the preselected correct therapeutic manipulative pressure start point before reaching the preselected correct therapeutic manipulation pressure stop point.

18. A therapeutic joint manipulation simulator according to claim 16 wherein the processor starts a counter when the reciprocating member is compressed to the preselected correct therapeutic manipulation pressure start point and stops the counter when the reciprocating member is compressed to the preselected correct therapeutic manipulation pressure stop point.

19. A therapeutic joint manipulation simulator according to claim 16 wherein the processor and the sensing device are located on a circuit board inside the reciprocating member.

20. A therapeutic joint manipulation simulator according to claim 16 including a rod attached to the housing and disposed parallel to a longitudinal axis of the housing and located in the hole of the housing between the first end of the housing and the second end of the housing, the sensing device detecting the relative displacement of the reciprocating member inside the housing hole by sensing the position of the rod.

21. A therapeutic joint manipulation simulator according to claim 16 wherein the sensing device includes a plurality of sensors disposed along a longitudinal axis of the housing and reciprocating member, a first one of the plurality of sensors selected by the switching circuit to identify the correct therapeutic manipulative pressure start point and a second one of the plurality of sensors selected by the switching circuit to identify the correct therapeutic manipulative stop point.

22. A therapeutic joint manipulation simulator according to claim 16 wherein the housing and reciprocating member both comprise elongated tubes each made out of a clear plastic.

* * * * *

UNITED STATES PATENT AND TRADEMARK OFFICE
CERTIFICATE OF CORRECTION

PATENT NO.     : 6,013,041
DATED          : January 11, 2000
INVENTOR(S)    : Leathers

It is certified that error appears in the above-identified patent and that said Letters Patent is hereby corrected as shown below:

Column 9,
Lines 58-59, "the bore" should read -- the axial bore --;

Column 10,
Line 37, "claim 4" should read -- claim 8 --.

Signed and Sealed this

Eighth Day of April, 2003

JAMES E. ROGAN
*Director of the United States Patent and Trademark Office*